United States Patent Office

2,978,477
Patented Apr. 4, 1961

2,978,477

NITRO KETO ALKYL ESTERS OF AROMATIC SULFONIC ACIDS

Gustave B. Linden, Los Angeles, Calif., assignor to Aerojet-General Corporation, Azusa, Calif., a corporation of Ohio No Drawing. Filed Dec. 8, 1953, Ser. No. 397,028

11 Claims. (Cl. 260—456)

This invention relates to new compositions of matter. More particularly this invention relates to nitro-keto-alkyl esters of aromatic sulfonic acids having the general formula:

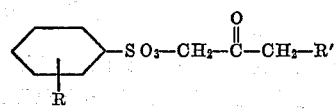

wherein R is a hydrogen or alkyl radical; and R′ is a nitroalkyl radical.

The compounds of this invention find valuable use as starting materials for the preparation of many nitro-containing compounds. Nitro-containing teritary and secondary amines useful as fuel components in propellant compositions, can be prepared by the reaction of this compound with primary or secondary amines. Moreover, these esters are useful as agents in the polymerization of nitro-containing olefins to limit chain growth and to provide nitro-containing terminal groups. The products of these polymerizations are particularly useful in propellant compositions as plasticizers and fuel components.

The compounds of this invention are prepared from nitro-2-keto aliphatic alcohols and aromatic sulfonyl halides in accordance with the general reaction scheme set forth below:

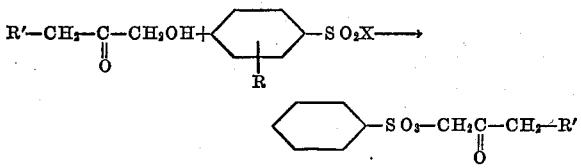

wherein R is a hydrogen or alkyl radical, R′ is a nitro alkyl group, and X is a halogen radical.

The reaction is preferably but not necessarily conducted in the presence of an inert solvent. Any inert solvent such as dioxane, hexane and benzene as well as pyridine, which was found to be inert under these conditions, may be used for this purpose.

The alcohols used as starting materials for my invention are readily prepared by the addition of nitro alkanes having a labile hydrogen radical to vinyl hydroxymethyl ketones, as disclosed in assignee's copending application Ser. No. 377,687, filed August 31, 1953, now abandoned.

To more fully illustrate my invention the following example is presented. It is to be understood, however, that this example is presented merely as a means of illustration and is not intended to limit the scope of the invention in any way.

EXAMPLE I

*5,5,5-trinitro-2-keto-1-pentyl p-toluenesulfonate*

A reactor, fitted with a stirrer, dropping funnel and thermometer, was charged with 40 ml. anhydrous pyridine. While maintaining the temperature of the mixture at −5 to 0° C., 4.8 gm. (0.02 mole) 5,5,5-trinitro-2-keto-1-pentanol was added and then 3.8 gm. (0.02 mole) p-toluenesulfonyl chloride. After 1.5 hours, the color of the mixture was deep brown. The reaction mixture was poured onto ice and a heavy brown oil formed which was washed with dilute hydrochloric acid. The oil was taken up in methanol, 10 ml., and crystallized. The purified product was in the form of colorless crystals, M.P. 104.5–105° C. The elemental analysis of the product is as follows: Calculated for $C_{12}H_{12}N_3O_{10}S$: percent C, 36.83; percent H, 3.35; percent S, 8.19. Found: percent C, 37.19; percent H, 3.64; percent S, 8.36.

From the foregoing example it is readily apparent that a wide variety of alcohols such as 5,5-dinitro-2-keto-1-hexanol, 5,5-dinitro-2-keto-1-heptanol, 5-nitro-2-keto-1-hexanol, etc., may be reacted in accordance with this invention to yield many desirable sulfonic acid esters.

Homologues of toluene sulfonic acid halides as well as their various isomers have also been found to be equivalent in this process and readily condense in the same manner as the toluene acid to form the desired esters. Similarly any acid halide may be used, however, chlorine, for reasons of convenience and cost, is ordinarily preferred.

I claim:

1. As a composition of matter an alkyl keto sulfonic ester having the general formula:

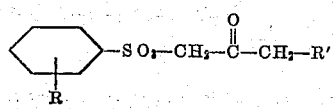

wherein R is a radical selected from the group consisting of hydrogen and lower alkyl radicals and R′ is a nitro substituted lower alkyl radical.

2. As compositions of matter, nitro-keto-alkyl sulfonates having the general formula:

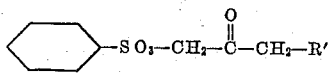

wherein R′ is a lower nitroalkyl radical.

3. As compositions of matter, nitro-keto-alkyl sulfonates having the general formula:

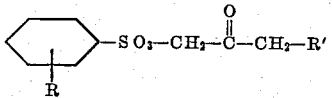

wherein R is a lower alkyl radical and R′ is a nitro substituted lower alkyl radical.

4. As a composition of matter the toluene sulfonic acid esters having the general formula:

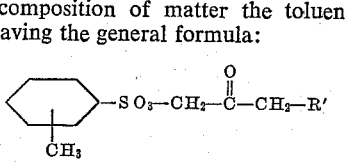

wherein R′ is a lower nitroalkyl radical.

5. As a composition of matter, 5,5,5-trinitro-2-keto-1-pentyl-p-toluenesulfonate having the structural formula:

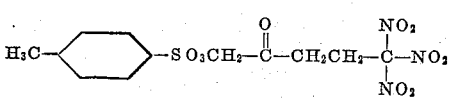

6. The method of preparing a sulfonic acid ester having the general formula:

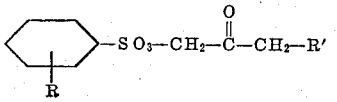

which comprises reacting an aryl sulfonic acid halide having the general formula:

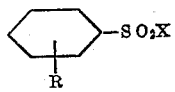

with a keto alcohol having the general formula:

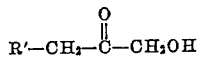

wherein R is a radical selected from the group consisting of hydrogen and lower alkyl radicals; X is a halogen radical and R' is a nitro substituted lower alkyl radical.

7. The method of preparing a nitro-keto-alkyl sulfonate having the general formula:

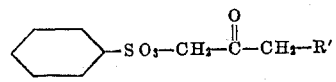

wherein R' is a nitro substituted lower alkyl radical, which comprises reacting a phenyl sulfonic acid halide with an alcohol having the general formula:

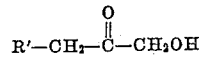

wherein R' is as defined above.

8. The method of preparing a nitro-keto-alkyl sulfonate having the general formula:

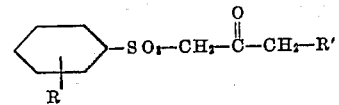

wherein R is a lower alkyl radical and R' is a nitro substituted lower alkyl which comprises reacting an alkyl phenyl sulfonic acid halide with a nitro-keto alcohol having the general formula:

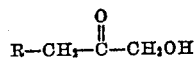

wherein R is as defined above.

9. The method of preparing a toluene sulfonic ester having the general formula:

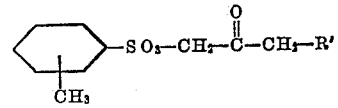

which comprises reacting a p-toluene sulfonic acid halide with a keto alcohol having the general formula:

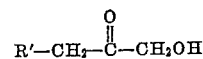

wherein R' is a nitro substituted lower alkyl radical.

10. The method of preparing 5,5,5-trinitro-2-keto-pentyl p-toluene sulfonate which comprises reacting p-toluene sulfonyl chloride with 5,5,5-trinitro-2-keto-1-pentanol.

11. The method of claim 4, wherein the reaction is conducted in the presence of an inert organic solvent.

References Cited in the file of this patent
UNITED STATES PATENTS 2,395,386    Baker ------------------ Feb. 26, 1946

OTHER REFERENCES

Riebsomer: Journal of Orangic Chemistry, volume 11, pages 182–4 (1946).
Boyd et al.: Journal of the American Chemical Society, volume 75, pages 3737–9 (August 5, 1953).
The Van Nostrand Chemist's Dictionary, D. Van Nostrand Co., New York (1953), page 543.